United States Patent [19]

Inoue et al.

[11] Patent Number: 5,283,660
[45] Date of Patent: Feb. 1, 1994

[54] VIDEO SIGNAL PROCESSING APPARATUS HAVING TIMEBASE CORRECTOR AND MEANS FOR REPLACING RESIDUAL ERROR DATA WITH SPECIFIC DATA

[75] Inventors: Takashi Inoue, Osaka; Hiromu Kitaura, Osakasayama; Nobuyuki Ogawa, Takatsuki; Tokikazu Matsumoto; Fumiaki Koga, both of Osaka, all of Japan

[73] Assignee: Matsushita Electric Industrial Co., Ltd., Osaka, Japan

[21] Appl. No.: 892,122

[22] Filed: Jun. 2, 1992

[30] Foreign Application Priority Data

Jun. 4, 1991 [JP] Japan ............... 3-132569

[51] Int. Cl.$^5$ .................. H04N 5/95; H04N 9/89
[52] U.S. Cl. ......................... 358/320; 360/36.2
[58] Field of Search ............. 358/320, 337, 326, 148; 360/36.1, 36.2; H04N 5/95, 9/89

[56] References Cited

U.S. PATENT DOCUMENTS

| 4,287,529 | 9/1981 | Tatami ................... 358/320 |
| 4,393,413 | 7/1983 | Kaneko ................. 360/36.1 |
| 4,443,821 | 4/1984 | Kato ..................... 358/326 |

FOREIGN PATENT DOCUMENTS 3533698  3/1987  Fed. Rep. of Germany ......... H04N 5/95

Primary Examiner—James J. Groody
Assistant Examiner—Chris Grant
Attorney, Agent, or Firm—Wenderoth, Lind & Ponack

[57] ABSTRACT

A video signal having a residual error superposed in the horizontal synchronizing signal period is received from a time axis error correcting circuit for suppressing the time axis error of video signal, and the residual error superposed portion is replaced with a specific data.

4 Claims, 3 Drawing Sheets

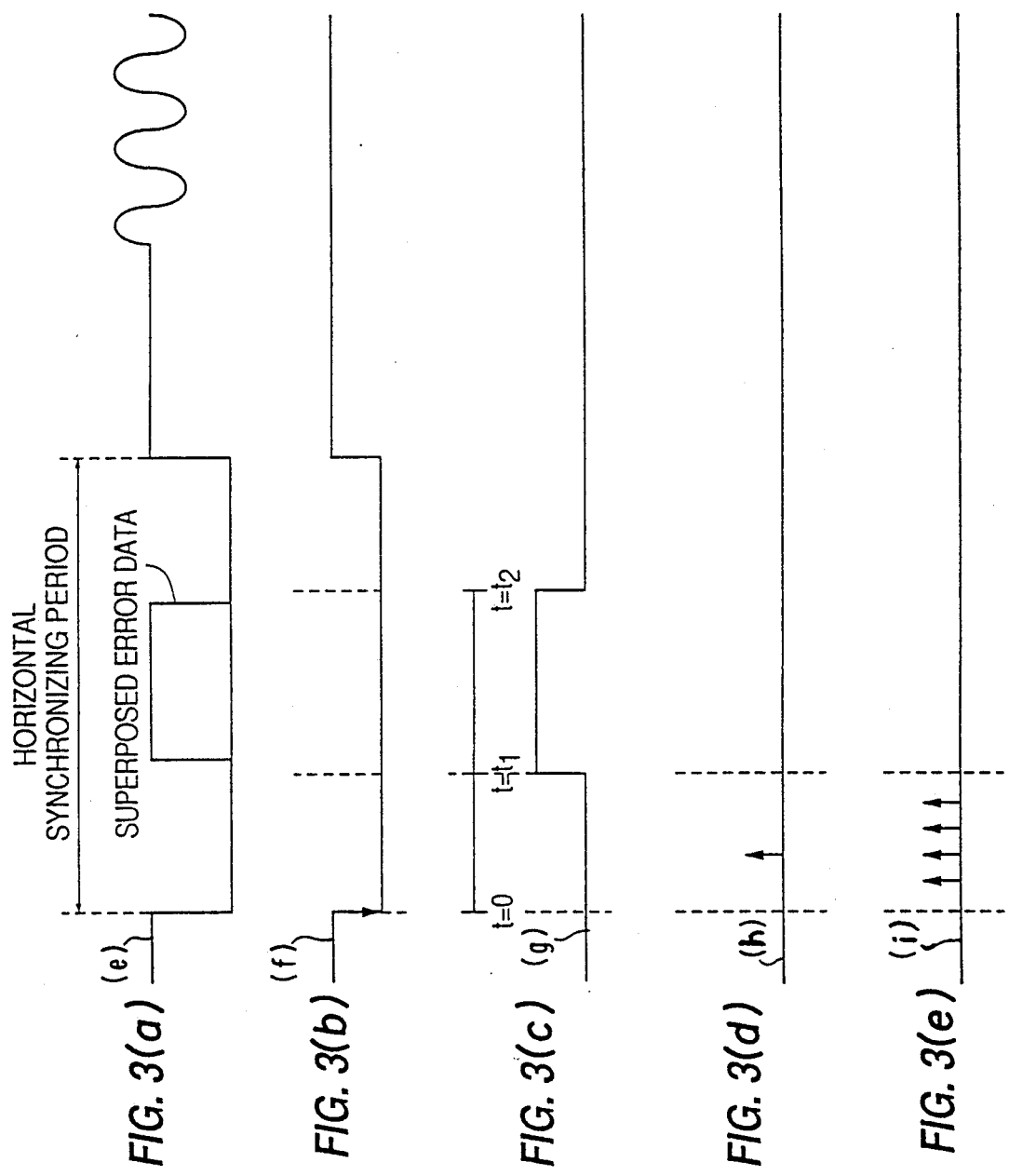

VIDEO SIGNAL PROCESSING APPARATUS HAVING TIMEBASE CORRECTOR AND MEANS FOR REPLACING RESIDUAL ERROR DATA WITH SPECIFIC DATA

BACKGROUND OF THE INVENTION

1. Field of the Invention

This invention relates to a video signal processing apparatus including a time base corrector for correcting fluctuations in a video signal reproduced from a recording medium and a video signal processing circuit for processing an output video signal from the time base corrector.

2. Description of the Prior Art

A conventional time base corrector converts an input video signal using an A/D converter to a digital signal, writes the digital signal into a memory operated using a write-in clock signal, reads the written signal from the memory using a standard clock, and converts the read-out signal back to its analog form. The write-in clock signal is synchronized with a horizontal synchronizing signal or color burst signal carried in the input video signal and contains a phase shift equivalent to a time base error in either the horizontal synchronizing signal or color burst signal. The detection of the time base error in the horizontal synchronizing or color burst signal is executed during a horizontal scanning period. Accordingly, a time base error within one horizontal scanning period is not corrected and remains as a velocity error.

For compensation for the velocity error, the read-out clock signal is phase modulated corresponding to a velocity error data fed from the write-in clock signal generating circuit and used for reading from the memory a desired data that is in turn converted to an analog form for output. Such an apparatus is disclosed in the form of a time base corrector in the U.S. Pat. No. 4,165,524. In the apparatus, the phase shift of the read-out clock signal is determined in proportion to a video data to be retrieved and hence the video data has to be converted to an analog form immediately after being read out from the memory with the read-out clock signal.

Accordingly, when signal processing is carried out with respect to time delays or continuation errors in the time base between the memory and D/A converter, a timing error occurs between the video data to be D/A converted and the velocity error data to be used for phase modulation of the read-out clock signal. For example, a timing error will likely occur during edge enhancement with the use of a line memory or reproduction of a still picture with field or frame memories. As a result, the velocity error can be no longer be compensated but is instead ironically enhanced.

Also, the processing of signals read from the memory through an arithmetic operation including in-line and in-field calculation involves computation of video signals having different velocity errors. Hence, the velocity error itself becomes different from the one before the arithmetic operation. In addition to the timing between the velocity error and the video data, another problem arises in that video data released from a calculating circuit fails to correspond to the velocity error data and thus, no exact compensation for the velocity error will be executed.

To solve the above problems, the present inventors proposed a method of superposing velocity error data within a horizontal synchronizing signal period of video signal. This method is disclosed in the U.S. patent application Ser. No. 07/712,041, filed Jun. 7, 1191. A velocity error is superposed as residual error data on the horizontal synchronizing signal of the video signal possessing the velocity error, and the signal having a time delay or discontinuity in the time axis is processed together with the video signal, and then the residual error data is taken out from the horizontal synchronizing signal of the video signal, so that the velocity error may be obtained which corresponds to the video signal to be D/A converted.

However, with the residual error data superposed in the horizontal synchronizing signal period, the horizontal synchronization is disturbed in the monitor receiver, and a normal image is not obtained.

SUMMARY OF THE INVENTION

It is hence a primary object of the invention to present a video signal processing apparatus capable of reproducing an image without disturbing the horizontal synchronization of a monitor receiver even with a video signal having residual error data superposed in the horizontal synchronizing signal period.

To achieve the above object, the invention is intended to replace the residual error superposing portion within the horizontal synchronizing signal period of the video signal delivered from a time base corrector with a specified data. As a result, a reproduced image is obtained without disturbing the horizontal synchronization of the monitor receiver. The specified data to be used may be any one of a specified fixed data, a sampled value in a portion other than the residual error superposed portion within the horizontal synchronizing signal period, and a mean value of sampled values in a specified period other than the residual error superposed portion within the horizontal synchronizing signal period.

BRIEF DESCRIPTION OF THE DRAWINGS

FIGS. 3A–3F are waveform diagrams showing the operation of the replacing circuits.

DESCRIPTION OF THE PREFERRED EMBODIMENT

Figure 1:
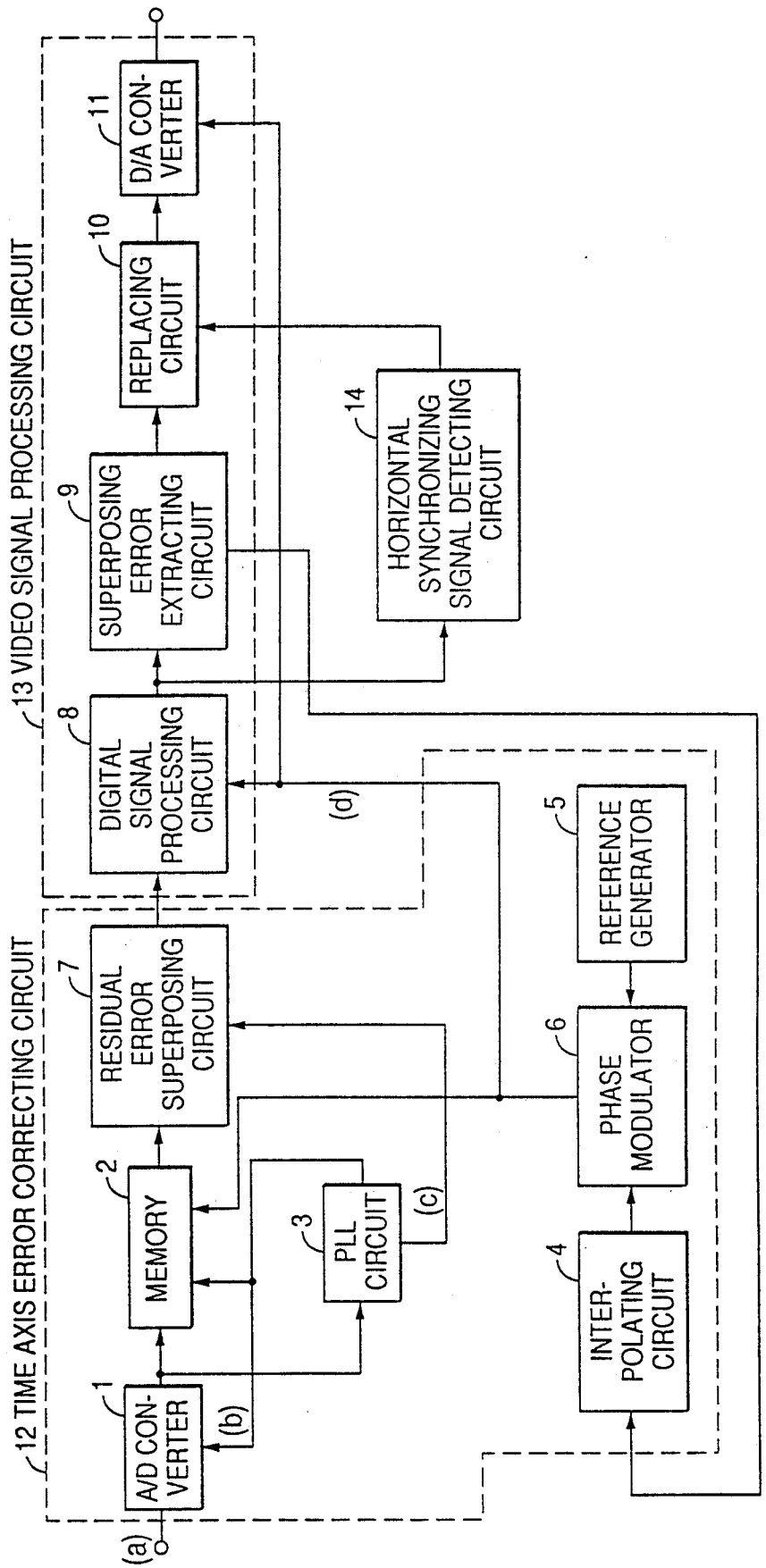
FIG. 1 is a block diagram of a video signal processing apparatus in an embodiment of the invention, FIGS. 2(A), (B) and (C) are block diagrams showing examples of the constitution of individual replacing circuits.

FIG. 1 is a block diagram of a video signal processing apparatus in an embodiment of the invention, comprising a time base corrector 12 and a video signal processing circuit 13.

An input video signal (a) is digitized according to a write-in clock pulse (b) by an A/D converter 1. The digitized video signal is written into a memory 2 according to the write-in clock pulse (b). The video signal written in the memory 2 is read out according to a read-out clock pulse (d). In a PLL circuit 3, the write-in clock pulse (b) is generated from the horizontal synchronizing signal or the color burst signal contained in the input video signal (a). An interpolating circuit 4 interpolates the error data sent out from a video signal processing circuit 13, and determines a velocity error. A reference generator 5 generates a reference signal for the read-out clock pulse (d). A phase modulator 6 modulates the phase of the reference signal depending on the velocity error produced from the interpolating circuit 4, and generates the read-out clock pulse (d). A residual error superposing circuit 7 superposes a residual error data from the PLL circuit 3 in a specific period within a horizontal synchronizing signal period of the video data read out from the memory 2. The output signal from the residual signal superposing circuit 7 is applied to a digital signal where it is subjected to circuit 8 possessing a time delay or time axis discontinuity processing. A superposing error extracting circuit 9 separates the residual error data superposed in the horizontal synchronizing signal period from the output video signal from the digital signal processing circuit 8. Afterwards the superposed portion of the residual error data is replaced with a specific data in a replacing circuit 10. Finally, the output video signal from the replacing circuit 10 is converted into an analog signal according to the read-out clock pulse (d) by a D/A converter 11.

The operation of this video signal processing apparatus is explained in detail below.

The PLL circuit 3 generates a write-in clock pulse (b) locked at the frequency of a horizontal synchronizing signal or a color burst signal contained in an input video signal (a). The input video signal (a) is converted into a digital video signal according to this write-by clock pulse (b) in the A/D converter 1. This digital video signal is written into the memory 2 according to the write-in clock pulse (b). Further, the PLL circuit 3 also delivers a velocity error which has not been completely eliminated within the loop as a residual error data (c) in digital data.

This residual error data (c) is superposed, in the residual error superposing circuit 7, on a specific period within the horizontal synchronizing signal period of the digital video signal read out from the memory 2. Therefore, the time axis correction circuit 12 produces a digital video signal having the residual error data superposed in the horizontal synchronizing signal period.

The digital video signal on which the residual error data is superposed is sent to a video signal processing circuit 13. In the video signal processing circuit 13, the signal undergoes the time delay or time axis discontinuity processing in the digital signal processing circuit 8. The digital signal processing circuit 8 may be a circuit which carries out a time delay processing such as digital filter, and/or a circuit which carries out a process for cutting off the continuity of the time axis such as still picture reproduction using a memory. A horizontal synchronization detecting circuit 14 receives the output video signal from the digital signal processing circuit 8, and separates the horizontal synchronizing signal.

From the horizontal synchronizing signal period of the video signal subjected to digital signal processing, the residual error data is read out by the superposing error extracting circuit 9. The residual error data which has been read out by the superposing error extracting circuit is transferred to the time axis error correcting circuit 12. If the residual error data superposed in the horizontal synchronizing signal period is left as it is, the horizontal synchronization would be disturbed in the monitor receiver, and a normal image would not be obtained. Accordingly, the residual error data superposing portion in the horizontal synchronizing signal period is replaced by a specific data in the replacing circuit 10. The video signal is provided with a DC potential (clamp potential) in a clamp circuit (not shown), and is A/D converted in the A/D converter 1. That is, the sync tip level is fixed at a specific voltage. Therefore, the residual error data superposed portion is restored to the original horizontal synchronizing signal waveform by replacing with a digital data corresponding to the clamp potential.

Figure 2A:
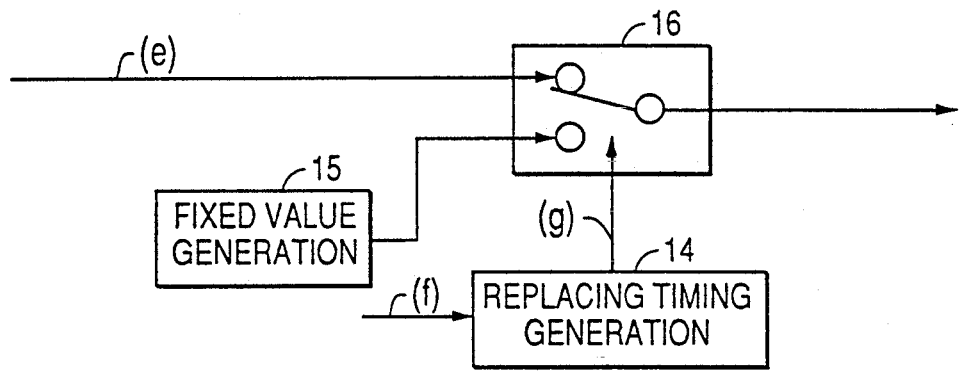
Figure 2B:
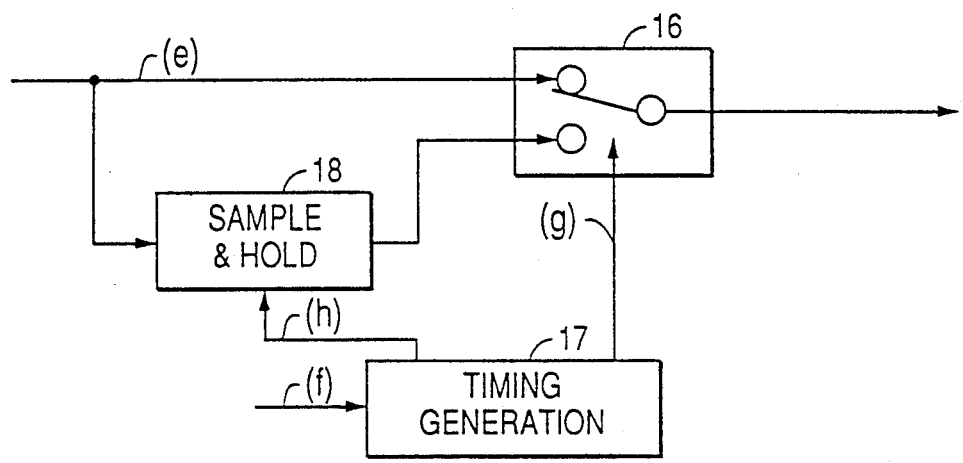
Figure 2C:
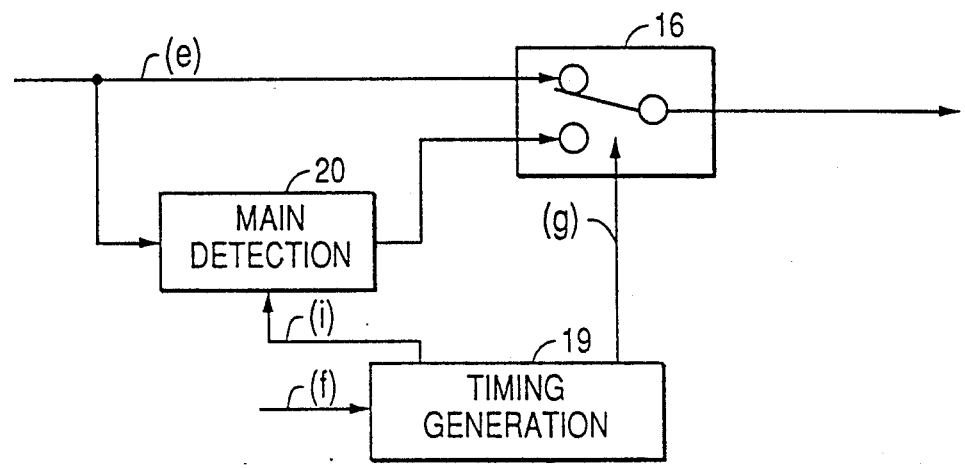

FIG. 2 (A) is a block diagram of the replacing circuit 10 for replacing the residual error data with a fixed value. According to a timing signal generated by a replacement timing generating circuit 14, either a level set by a fixed level generating circuit 15 or the video data are selected by a selector 16, and delivered. FIG. 3 is a waveform diagram showing the operation of the replacing circuit 10. The horizontal synchronizing signal (f) of digital video signal (e) is detected by the horizontal synchronizing signal detecting circuit 14. The replacement timing generating circuit 14 measures the time from the leading edge of the horizontal synchronizing signal (f), and produces a replacement timing signal (g) which is a pulse signal occurring from time t1 to time t2. Here, it is set as "1" if t1<t<t2, and "0" otherwise, but, needless to say, the polarity may be set reversely. The range of t1<t<t2 may be set at least equal to or wider than the period of superposing the residual error data. The selector 16 selects the video signal (e) when the replacement timing signal (g) is 0, and the output signal of the fixed value generating circuit 15 when the timing signal (g) is 1.

To the interpolating circuit 4 in the time axis error correcting circuit 12, the residual error data is transferred in every horizontal scanning period. The residual error data between two consecutive horizontal scanning periods is interpolated to obtain the velocity error data. This velocity error data is matched in timing with the output of the replacing circuit 10. The phase modulator 6 generates a read-out clock pulse (d) by modulating the phase of the reference signal generated by the reference generator 5 by the velocity error data. The read-out clock pulse (d) is sent out to the video signal processing circuit 13. According to this read-out clock pulse (d), the output of the replacing circuit 10 is D/A converted by the D/A converter 11, so that an analog video signal corrected also of the velocity error is obtained as an output signal.

Meanwhile, in the above description, the portion of extracting the residual error data (g) is replaced by a fixed value. However, the value at a specific point in a portion from the leading edge of the horizontal synchronizing signal till just before the superposed portion of the residual error data may be sampled and held, and this value may be used as the replacing value. FIG. 2 (B) is a block diagram of a replacing circuit for replacing the residual error data by holding a value at the specific point. A timing generating circuit 17 generates a sampling pulse (h) within the period from the leading edge of the horizontal synchronizing signal till just before the superposing portion of the residual error data, that is, in the range of 0<t<t1, by measuring the time from the leading edge of the horizontal synchronizing signal (f) in FIG. 3. A sample & hold circuit 18, samples and holds the digital video signal (f) by the sampling pulse (h). The selector 16 selects the digital video signal (e) when the replacing timing signal (g) is 0, and the output signal of the sample & hold circuit 18 when the timing signal (g) is 1.

It may be also possible to replace with a mean of sampled values in a specific period out of the period from the leading edge of the horizontal synchronizing signal to just before the superposing portion of the residual error data. FIG. 2 (C) is a block diagram of the replacing circuit for replacing the residual error data with a mean of sampled values in the specific period. The timing generating circuit 19 measures the time from the leading edge of the horizontal synchronizing signal (f) in FIG. 3, and generates sampling pulses (i) from the leading edge of the horizontal synchronizing signal till just before the superposed portion of the residual error data, that is, in the period of $0<t<t1$. In this example, four sampling pulses are shown, but the number of pulses may not be particularly limited. A mean calculating circuit 20 samples the digital video signal (e) by the sampling pulses generated in the timing generating circuit 19, and calculates and holds the mean of values at the sampling points. The selector 16 selects and delivers the digital video signal (e) when the replacing timing signal (g) is 0, and the output signal of the mean calculating circuit 20 when the timing signal (g) is 1.

Thus, according to the invention, by replacing the residual error data superposed in the horizontal synchronizing signal period of the video signal with a specific data, a reproduced image is obtained without disturbing the horizontal synchronization of the monitor receiver.

What is claimed is:

1. A video signal processing apparatus comprising:
   a time base corrector for correcting a time base error of an input video signal to obtain a time base corrected video signal, including a residual error superposing means for superposing the time base corrected video signal in a portion of a horizontal synchronizing period with a residual error data indicative of a residual error which cannot be corrected by the time base corrector; and
   a video signal processing circuit for processing the time base corrected video signal from the time base corrector, including a specific data generating means for generating a specific data, and a replacing means for replacing the residual error data superposed on the time base corrected video signal by the specific data.

2. A video signal processing apparatus of claim 1, wherein the specific data generating means produces a predetermined fixed value.

3. A video signal processing apparatus of claim 1, wherein the specific data generating means holds and delivers a value at a specific point in a portion from a leading edge of the horizontal synchronizing signal till just before the portion in which the residual error data is superposed.

4. A video signal processing apparatus of claim 1, wherein the specific data generating means produces a mean of values in a specific period from a leading edge of the horizontal synchronizing signal till just before the portion in which the residual error data is superposed.

* * * * *